US008818054B2

(12) United States Patent
Amento et al.

(10) Patent No.: US 8,818,054 B2
(45) Date of Patent: *Aug. 26, 2014

(54) AVATARS IN SOCIAL INTERACTIVE TELEVISION

(71) Applicant: AT&T Intellectual Property I, L.P., Atlanta, GA (US)

(72) Inventors: Brian Scott Amento, Morris Plains, NJ (US); Christopher Harrison, Mount Kisco, NY (US); Larry Stead, Upper Montclair, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 121 days.

This patent is subject to a terminal disclaimer.

(21) Appl. No.: 13/664,117

(22) Filed: Oct. 30, 2012

(65) Prior Publication Data

US 2013/0057556 A1 Mar. 7, 2013

Related U.S. Application Data

(63) Continuation of application No. 13/308,335, filed on Nov. 30, 2011, now Pat. No. 8,311,295, which is a continuation of application No. 13/114,879, filed on May 24, 2011, now Pat. No. 8,098,905, which is a continuation of application No. 12/113,704, filed on May 1, 2008, now Pat. No. 7,953,255.

(51) Int. Cl.
*G06K 9/00* (2006.01)

(52) U.S. Cl.
USPC .......................................... 382/118; 382/173

(58) Field of Classification Search
USPC ................................................. 382/118, 173
See application file for complete search history.

(56) References Cited

U.S. PATENT DOCUMENTS

| 5,550,928 | A | 8/1996 | Lu et al. |
| 5,715,325 | A | 2/1998 | Bang et al. |
| 6,184,926 | B1 | 2/2001 | Khosravi et al. |
| 6,272,231 | B1 | 8/2001 | Maurer et al. |
| 6,580,811 | B2 | 6/2003 | Maurer et al. |
| 6,732,146 | B1 | 5/2004 | Miyake |
| 6,919,892 | B1 | 7/2005 | Cheiky et al. |
| 6,948,131 | B1 | 9/2005 | Neven et al. |

(Continued)

OTHER PUBLICATIONS

Harrison, Chris; Amento, Brian, "CollaboraTV: Using Asynchronous Communication to Make TV Social Again", Proceedings of EuroITV 2007.

(Continued)

*Primary Examiner* — John Strege
(74) *Attorney, Agent, or Firm* — Jackson Walker L.L.P.

(57) ABSTRACT

Virtual environments are presented on displays along with multimedia programs to permit viewers to participate in a social interactive television environment. The virtual environments include avatars that are created and maintained in part using continually updated animation data that may be captured from cameras that monitor viewing areas in a plurality of sites. User input from the viewers may be processed in determining which viewers are presented in instances of the virtual environment. Continually updating the animation data results in avatars accurately depicting a viewer's facial expressions and other characteristics. Presence data may be collected and used to determine when to capture background images from a viewing area that may later be subtracted during the capture of animation data. Speech recognition technology may be employed to provide callouts within a virtual environment.

18 Claims, 5 Drawing Sheets

(56) References Cited

U.S. PATENT DOCUMENTS

| | | |
|---|---|---|
| 7,577,310 B2 | 8/2009 | Kinjo |
| 7,953,255 B2 * | 5/2011 | Amento et al. ............... 382/118 |
| 8,098,905 B2 * | 1/2012 | Amento et al. ............... 382/118 |
| 8,311,295 B2 * | 11/2012 | Amento et al. ............... 382/118 |
| 2002/0015514 A1 | 2/2002 | Kinjo |
| 2003/0118974 A1 | 6/2003 | Obrador |
| 2003/0156304 A1 | 8/2003 | Fedorovskaya et al. |
| 2008/0215975 A1 | 9/2008 | Harrison et al. |
| 2008/0312949 A1 | 12/2008 | Nagasaka et al. |

OTHER PUBLICATIONS

"AmigoTV: A Social TV Experience Through Triple-Play Convergence", Alcatel White Paper, 2005.

* cited by examiner

AVATARS IN SOCIAL INTERACTIVE TELEVISION

The present patent application is a continuation of U.S. patent application Ser. No. 13/308,335, filed Nov. 30, 2011, which is a continuation of U.S. patent application Ser. No. 13/114,879, filed May 24, 2011 (now U.S. Pat. No. 8,098,905), which is a continuation of U.S. patent application Ser. No. 12/113,704 (now U.S. Pat. No. 7,953,255), filed May 1, 2008, the entirety of which are hereby incorporated by reference.

BACKGROUND

1. Field of the Disclosure

The present disclosure generally relates to distributing digital television content and more particularly to presenting a virtual environment including avatars that represent viewers of the television content.

2. Description of the Related Art

Televisions are often communicatively coupled to set-top boxes for receiving multimedia programs from a provider network. Friends physically located in different households may socialize over telephones, for example, while simultaneously viewing television content accessed by their respective set-top boxes from the provider network.

DESCRIPTION OF THE EMBODIMENT(S)

Figure 1:
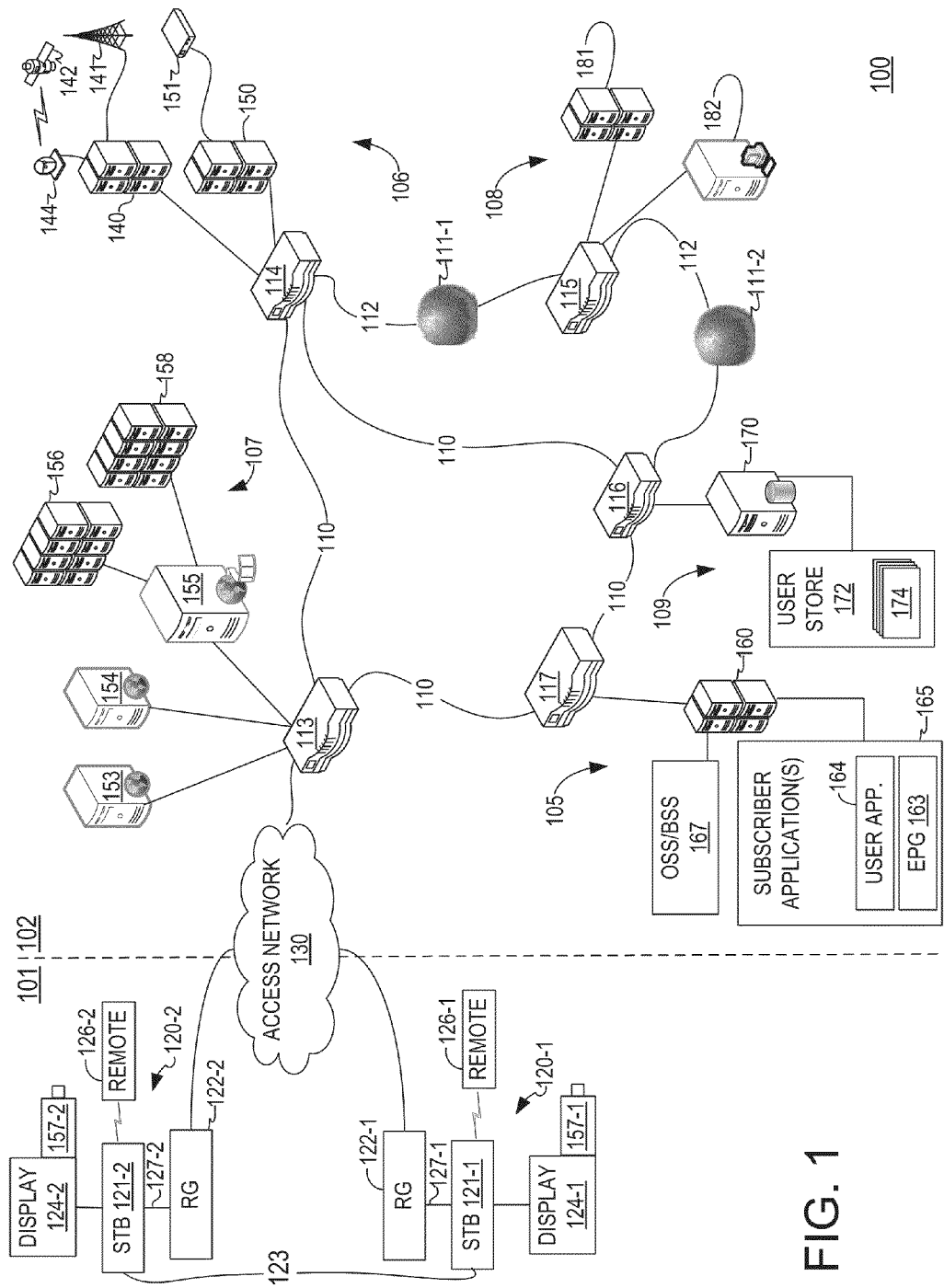
FIG. 1 depicts an example provider network that includes set-top boxes enabled for presenting a virtual environment in accordance with disclosed embodiments.

In one aspect, an embodied method includes presenting a virtual environment containing avatars. In some embodiments, the virtual environment is presented during the presentation of a multimedia program. The method includes continually monitoring a viewer to obtain animation input data that is used to influence an avatar corresponding to the viewer. The method further includes displaying in the virtual environment an avatar corresponding to the viewer. In addition to displaying the avatar corresponding to the viewer, the virtual environment displays further avatars corresponding to further viewers. The method further includes continually updating the avatar in response to the animation input data, which may be continually received or continually updated. In some embodiments, monitoring the viewer includes estimating facial expressions and the animation input data may include facial expression data. In some embodiments, the method further includes detecting laughter from the person and the animation input data includes laughter data. The virtual environment including the avatars may be superimposed over a viewing window containing a multimedia program. Alternatively, the virtual environment may be presented within a perimeter that is outside of a viewing window, to lessen any interference the virtual environment may create in viewing the multimedia program. The method may further include subtracting background data captured from a viewing area in which a viewer sits. Subtracting background data may result in animation input data that corresponds substantially only to the monitored person. In some embodiments, the method includes capturing the background data for the viewing area in response to detecting a lack of motion in a viewing area. Similarly, the beginning or end of a viewing session may be estimated or detected by sensing motion in the viewing area. The method may further include detecting the viewer entering the viewing area and simulating the avatar entering the virtual environment in response to the detecting operation.

In another aspect, an embodied computer program product includes instructions for presenting both a virtual environment and a multimedia program simultaneously. The virtual environment contains one or more avatars that correspond to one or more viewers in one or more viewing areas during a viewing session. The computer program product has instructions that are operable for receiving animation input data that results from monitoring one or more viewers. Further instructions are operable for displaying one or more avatars that correspond to the viewers in a virtual environment. The computer program product further has instructions operable for continually updating the one or more avatars in response to animation input data that is continually updated in some embodiments. Received animation input data may include facial expression data captured by continually monitoring, estimating, and processing images captured from a viewers face. In addition, animation data may include laughter data that is generated in response to detecting laughter from the viewer. Detecting laughter may be achieved by processing some combination of audio data and video data. In some embodiments, when presenting the virtual environment including the one or more avatars that correspond to one or more viewers, instructions are operable for superimposing the virtual environment over a multimedia program. Alternatively, further instructions may be enabled for placing the virtual environment within a perimeter outside a presentation window of the multimedia program on a display. Additional instructions may be operable for subtracting background data received from a viewing area to result in animation input data that corresponds substantially to the monitored person and not the viewing area around the monitored person. Further instructions in some embodiments are operable for receiving presence data by measuring an amount of motion in a viewing area. In addition, further instructions may be operable for detecting the beginning or end of a viewing session by detecting motion in the viewing area.

In a further aspect, an embodied service is for simultaneously presenting on one or more displays a virtual environment and a multimedia program. The service includes receiving viewer requests to be presented with instances of the virtual environment. The virtual environment, in some embodiments, includes a plurality of avatars that correspond to the plurality of viewers that may be in different locales. Some embodied services further include translating animation data generated from individual viewers of the plurality of viewers into a plurality of synthetic avatar actions taken by corresponding avatars. The synthetic avatar actions are presented within the virtual environment and are intended to mimic actions by corresponding viewers. In some embodiments, animation data is continually obtained from one or more viewing areas that include the plurality of viewers. Viewers may be monitored to detect when they enter or leave a viewing area. Facial expression data and laughter data may be collected and processed as animation data that may be translated into synthetic avatar actions within a virtual environment presented on displays in each locale of a participating viewer. In some embodiments, viewers provide permission input that may affect which locales have the viewer's avatar displayed within instances of the virtual environment.

The following description includes examples and details to enable one of ordinary skill in the art to practice the claimed subject matter without undue experimentation. It should be apparent to a person of ordinary skill that disclosed embodiments are exemplary and not exhaustive of all possible embodiments. Regarding reference numerals used to describe elements in the figures, a hyphenated form of a reference numeral refers to a specific instance of an element and the un-hyphenated form of the reference numeral refers to the element generically or collectively. Thus, for example, "set-top box 121-1" refers to an instance of a set-top box. Accordingly, multiple set-top boxes may be referred to collectively as "set-top boxes 121" or "STBs 121." In addition, using this numbering convention, a single set-top box may be referred to more generically as "set-top box 121" or "STB 121."

Disclosed embodiments relate to social interactive television and, in some cases, include the presentation of a virtual environment simultaneously with multimedia content such as a television program. Television programs, video-on-demand ("VOD") programs, radio programs, and a variety of other types of multimedia content may be distributed to multiple viewers (i.e., users, subscribers, participants) over various types of networks. Suitable types of networks that may be provisioned for distribution and delivery of multimedia content include, as examples, telephony-based networks, coaxial-based networks, satellite-based networks, and the like.

In some networks that may include, for example, traditional coaxial-based "cable" networks, a service provider distributes a mixed signal that may include a relatively large number of multimedia content channels. Each channel may be transmitted at a different frequency band (i.e., channel), through a coaxial cable, a fiber-optic cable, or a combination of these and potentially other cables or wireless media. The enormous bandwidth required to transport simultaneously large numbers of multimedia channels is a source of constant challenge for cable-based providers. In these types of networks, a tuner or some form of receiver is required to select a channel from the mixed signal for playing or recording. Accordingly, a user wishing to play or record multiple channels simultaneously may need distinct tuners for each desired channel. This is an inherent limitation of cable networks and other mixed signal networks.

In contrast to mixed signal networks, Internet Protocol Television (IPTV) networks generally distribute content to a user only in response to user requests. Therefore, at any given time, the number of content channels provided to the user is relatively small. For example, a user may simultaneously receive one or more multimedia streams that contain one channel for viewing and possibly one or more channels for recording during viewing of the first channel. As suggested by the name, IPTV networks typically employ IP and other open, mature, and pervasive networking technologies. During transmission, rather than requiring the use of a particular frequency band, an IPTV television program, movie, or other form of multimedia content is a digital, packet-based stream that corresponds to a particular network address (e.g., an IP address). In such networks, the concept of a channel is inherently distinct from the frequency channels native to mixed signal networks. Moreover, whereas a mixed signal network may require a hardware-intensive tuner for every channel to be played, IPTV channels can be "tuned" simply by transmitting a request (e.g., a universal resource locator (URL) request) to a server.

To transmit multimedia content, IPTV service providers may utilize existing infrastructure such as existing telephone lines. In addition, within a user's site (e.g., home or office), an IPTV service provider may utilize customer premise equipment (CPE), a residential gateway (RG), digital subscriber line (DSL) modem, or other equipment that be enabled for receiving multimedia content and data from the provider network. Such CPE may include set-top boxes (STBs), displays, and other appropriate equipment converting the received multimedia content into usable form. In some implementations, a core portion of an IPTV network is implemented with fiber optic cables while the so-called last mile may include conventional, unshielded, twisted-pair, copper cables (e.g., traditional telephone lines).

Typical IPTV networks support bidirectional (i.e., two-way) communication between a user's CPE and the content provider's equipment. Bidirectional communication allows the content provider (i.e., "service provider") to deploy advanced features, such as VOD, pay-per-view, electronic programming guides ("EPGs"), and the like. Bidirectional networks may also enable a service provider to collect information related to a user's preferences, viewing habits and the like. In accordance with disclosed embodiments, bidirectional provider networks allow for the presentation of a virtual environment including a plurality of avatars that represent participating users (i.e., viewers) in a social television environment. The bidirectional nature of the IPTV network also allows software applications related to the social interactive television environment to be network-based. In addition, communication between STBs over the provider network is permitted due to the bidirectional nature of an IPTV provider network. Accordingly, animation input data, for example video images captured from STB-based cameras, may be transmitted over a provider network for use in updating avatars displayed in remote instances of the virtual environment.

Additional details of embodied systems and methods are included in the attached drawings. FIG. 1 depicts selected aspects of a multimedia content distribution network (MCDN) 100. MCDN 100 is a provider network that, as shown, may be divided into a client side 101 and a service provider side 102 (a.k.a. server side 102). The client side 101 includes all or most of the resources depicted to the left of access network 130 while the server side 102 encompasses the remainder.

Client side 101 and server side 102 are linked by access network 130. In embodiments of MCDN 100 that leverage telephony hardware and infrastructure, access network 130 may include the "local loop" or "last mile," which refers to the physical wires that connect a user's home or business to a local exchange. In these embodiments, the physical layer of access network 130 may include twisted pair copper cables or fiber optics cables employed as either fiber to the curb (FTTC) or fiber to the home (FTTH).

Access network 130 may include hardware and firmware to perform signal translation when access network 130 includes multiple types of physical media. For example, an access network that includes twisted-pair telephone lines to deliver multimedia content to consumers may utilize DSL. In embodiments of access network 130 that implement FTTC, a DSL access multiplexer (DSLAM) may be used within access network 130 to transfer signals containing multimedia content from optical fiber to copper wire for DSL delivery to consumers.

In other embodiments, access network 130 may transmit radio frequency (RF) signals over coaxial cables. In these embodiments, access network 130 may utilize quadrature amplitude modulation (QAM) equipment for downstream traffic. In these embodiments, access network 130 may receive upstream traffic from a consumer's location using quadrature phase shift keying (QPSK) modulated RF signals. In such embodiments, a cable modem termination system (CMTS) may be used to mediate between IP-based traffic on private network 110 and access network 130.

Services provided by the server side resources as shown in FIG. 1 may be distributed over a private network 110. In some embodiments, private network 110 is referred to as a "core network." In at least some embodiments, private network 110 includes a fiber optic WAN, referred to herein as the fiber backbone, and one or more video hub offices (VHOs). In large-scale implementations of MCDN 100, which may cover a geographic region comparable, for example, to the region served by telephony-based broadband services, private network 110 includes a hierarchy of VHOs.

A national VHO, for example, may deliver national content feeds to several regional VHOs, each of which may include its own acquisition resources to acquire local content, such as the local affiliate of a national network, and to inject local content such as advertising and public service announcements from local entities. The regional VHOs may then deliver the local and national content for reception by users served by the regional VHO. The hierarchical arrangement of VHOs, in addition to facilitating localized or regionalized content provisioning, may conserve bandwidth by limiting the content that is transmitted over the core network and injecting regional content "downstream" from the core network.

Segments of private network 110, as shown in FIG. 1, are connected together with a plurality of network switching and routing devices referred to simply as switches 113 through 117. The depicted switches include client facing switch 113, acquisition switch 114, operations-systems-support/business-systems-support (OSS/BSS) switch 115, database switch 116, and an application switch 117. In addition to providing routing/switching functionality, switches 113 through 117 preferably include hardware or firmware firewalls, not depicted, that maintain the security and privacy of network 110. Other portions of MCDN 100 communicate over a public network 112, including, for example, the Internet or other type of web-network where the public network 112 is signified in FIG. 1 by the World Wide Web icons 111.

As shown in FIG. 1, the client side 101 of MCDN 100 depicts two of a potentially large number of client side resources referred to herein simply as client(s) 120. Each client 120, as shown, includes an STB 121, an RG 122, a display 124, and a remote control device 126. As shown, displays 124 are coupled to cameras 157 for capturing animation data from users (e.g., viewers) in viewing areas that may be in front of and around displays 124. Clients 120 may be in different user sites, for example houses that are in different cities. In the depicted embodiment, STBs 121 communicates with server side devices through access network 130 via RGs 122 to provide locally collected animation data that may undergo local processing or network processing to result in the presentation of multiple instances of a virtual environment that may each include avatars corresponding to individual viewers.

As shown in FIG. 1, RGs 122 may include elements of broadband modems (e.g., DSL modems), as well as elements of Ethernet compliant routers and/or access points that are suitable for communication over LANs 127. In some embodiments, STBs 121 may be uniquely addressable Ethernet compliant devices. In the embodiment depicted in FIG. 1, remote control device 126 communicates wirelessly with STB 121 using an infrared (IR) or RF signal. Display 124 may include any form of conventional frequency tuner and may contain all or part of the functionality and circuitry of RG 122, STB 121, and camera 157.

In IPTV compliant implementations of MCDN 100, clients 120 are operable to receive packet-based multimedia streams from access network 130 and process the streams for presentation on displays 124. In addition, clients 120 are network-aware systems that may facilitate bidirectional-networked communications with server side 102 resources to facilitate network-hosted services and features. Because clients 120 are operable to process multimedia content streams while simultaneously supporting more traditional web-like communications, clients 120 may support or comply with a variety of different types of network protocols including streaming protocols such as reliable datagram protocol (RDP) over user datagram protocol Internet protocol (UDP/IP) and web protocols such as hypertext transport protocol (HTTP) over transport control protocol IP (TCP/IP).

The depiction in FIG. 1 of server side 102 emphasizes network capabilities including application resources 105, content acquisition resources 106, content delivery resources 107, and OSS/BSS resources 108. One or more of these resources may have access to database resources 109.

Before distributing multimedia content to viewers, MCDN 100 first obtains multimedia content from content providers. To that end, acquisition resources 106 encompass various systems and devices to acquire multimedia content, reformat it when necessary or desired, and process it for delivery to users over private network 110 and access network 130.

Acquisition resources 106 may include, for example, systems for capturing analog and/or digital content feeds, either directly from a content provider or from a content aggregation facility. Content feeds transmitted via VHF/UHF broadcast signals may be captured by an antenna 141 and delivered to live acquisition server 140. Similarly, live acquisition server 140 may capture down linked signals transmitted by a satellite 142 and received by a parabolic dish 144. In addition, live acquisition server 140 may acquire programming feeds transmitted via high-speed fiber feeds or other suitable transmission means. Acquisition resources 106 may further include signal conditioning systems and content preparation systems for encoding content.

As depicted in FIG. 1, content acquisition resources 106 include a VOD acquisition server 150. VOD acquisition server 150 receives content from one or more VOD sources that may be external to the MCDN 100 including, as examples, discs represented by a DVD player 151, or transmitted feeds (not shown). VOD acquisition server 150 may temporarily store multimedia content for transmission to a VOD delivery server 158 in communication with client-facing switch 113.

After acquiring multimedia content, acquisition resources 106 may transmit acquired content over private network 110, for example, to one or more servers in content delivery resources 107. Prior to transmission, live acquisition server 140 may encode acquired content using, e.g., MPEG-2, H.263, a Windows Media Video (WMV) family codec, or another suitable video codec. Acquired content may be encoded and composed to preserve network bandwidth and network storage resources and, optionally, to provide encryption for securing the content. VOD content acquired by VOD acquisition server 150 may be in a compressed format prior to acquisition and further compression or formatting prior to transmission may be unnecessary and/or optional.

Content delivery resources 107 as shown in FIG. 1 are in communication with private network 110 via client facing switch 113. In the depicted implementation, content delivery resources 107 include a content delivery server 155 in communication with a live or real-time content server 156 and a VOD delivery server 158. For purposes of this disclosure, the use of the term "live" or "real-time" in connection with content server 156 is intended primarily to distinguish the applicable content from the content provided by VOD delivery server 158. The content provided by a VOD server is sometimes referred to as time-shifted content to emphasize the ability to obtain and view VOD content substantially without regard to the time of day or the day of week.

Content delivery server 155, in conjunction with live content server 156 and VOD delivery server 158, responds to viewer requests for content by providing the requested content to the viewer. The content delivery resources 107 are, in some embodiments, responsible for creating video streams that are suitable for transmission over private network 110 and/or access network 130. In some embodiments, creating video streams from the stored content generally includes generating data packets by encapsulating relatively small segments of the stored content in one or more packet headers according to the network communication protocol stack in use. These data packets are then transmitted across a network to a receiver (e.g., STB 121 of client 120), where the content is parsed from individual packets and re-assembled into multimedia content suitable for processing by a STB decoder.

Viewer requests received by content delivery server 155 may include an indication of the content that is being requested. In some embodiments, this indication includes an IP address associated with the desired content. For example, a particular local broadcast television station may be associated with a particular channel and the feed for that channel may be associated with a particular IP address. When a user wishes to view the station, the subscriber may interact with remote control device 126 to send a signal to STB 121 indicating a request for the particular channel. When STB 121 responds to the remote control signal, the STB 121 changes to the requested channel by transmitting a request that includes an IP address associated with the desired channel to content delivery server 155.

Content delivery server 155 may respond to a request for content by making a streaming video signal accessible STB 121 for conversion into usable form by display 124. Content delivery server 155 may employ unicast and broadcast techniques when making content available to a viewer. In the case of multicast, content delivery server 155 employs a multicast protocol to deliver a single originating stream to multiple clients. When a new user requests the content associated with a multicast stream, there may be latency associated with updating the multicast information to reflect the new viewer as a part of the multicast group. To avoid exposing this undesirable latency to the user, content delivery server 155 may temporarily unicast a stream to the requesting user. When the user is ultimately enrolled in the multicast group, the unicast stream is terminated and the user receives the multicast stream. Multicasting desirably reduces bandwidth consumption by reducing the number of streams that must be transmitted over the access network 130 to clients 120.

As illustrated in FIG. 1, a client-facing switch 113 provides a conduit between client side 101, including client 120, and server side 102. Client-facing switch 113, as shown, is so-named because it connects directly to the client 120 via access network 130 and it provides the network connectivity of IPTV services to users' locations.

To deliver multimedia content, client-facing switch 113 may employ any of various existing or future Internet protocols for providing reliable real-time streaming multimedia content. In addition to the TCP, UDP, and HTTP protocols referenced above, such protocols may use, in various combinations, other protocols including, real-time transport protocol (RTP), real-time control protocol (RTCP), file transfer protocol (FTP), and real-time streaming protocol (RTSP), as examples.

In some embodiments, client-facing switch 113 routes multimedia content encapsulated into IP packets over access network 130. For example, an MPEG-2 transport stream may be sent, in which the transport stream consists of a series of 188-byte transport packets, for example. Client-facing switch 113 as shown is coupled to a content delivery server 155, acquisition switch 114, applications switch 117, a client gateway 153, and a terminal server 154 that is operable to provide terminal devices with a connection point to the private network 110. Client gateway 153 may provide subscriber access to private network 110 and the resources coupled thereto.

In some embodiments, STB 121 may access MCDN 100 using information received from client gateway 153. Subscriber devices may access client gateway 153 and client gateway 153 may then allow such devices to access the private network 110 once the devices are authenticated or verified. Similarly, client gateway 153 may prevent unauthorized devices, such as hacker computers or stolen STBs, from accessing the private network 110. Accordingly, in some embodiments, when an STB 121 accesses MCDN 100, client gateway 153 verifies subscriber information by communicating with user store 172 via the private network 110. Client gateway 153 may verify billing information and subscriber status by communicating with an OSS/BSS gateway 167. OSS/BSS gateway 167 may transmit a query to the OSS/BSS server 181 via an OSS/BSS switch 115 that may be connected to a public network 112. Upon client gateway 153 confirming subscriber and/or billing information, client gateway 153 may allow STB 121 access to IPTV content, VOD content, and other services. If client gateway 153 cannot verify subscriber information for STB 121, for example, because it is connected to an unauthorized twisted pair or RG, client gateway 153 may block transmissions to and from STB 121 beyond the private access network 130.

MCDN 100, as depicted, includes application resources 105, which communicate with private network 110 via application switch 117. Application resources 105 as shown include an application server 160 operable to host or otherwise facilitate one or more subscriber applications 165 that may be made available to system subscribers. For example, subscriber applications 165 as shown include an electronic programming guide (EPG) application 163. Subscriber applications 165 may include other applications including user applications 164. In addition to subscriber applications 165, application server 160 may host or provide a gateway to operation support systems and/or business support systems. In some embodiments, communication between application server 160 and the applications that it hosts and/or communication between application server 160 and client 120 may be via a conventional web based protocol stack such as HTTP over TCP/IP or HTTP over UDP/IP.

As shown in FIG. 1, application server 160 hosts an application referred to generically as user application 164. User application 164 represents an application that may deliver a value-added feature to a subscriber or a user which may not necessarily subscribe to any service. User application 164 is illustrated in FIG. 1 to emphasize the ability to extend the network's capabilities by implementing one or more networked-hosted application. Because the application resides on the network, it generally does not impose any significant requirements or imply any substantial modifications to the client 120 including the STB 121. In some instances, an STB 121 may require knowledge of a network address associated with user application 164, but STB 121 and the other components of client 120 are largely unaffected. Accordingly, STBs that are not locally networked together may exchange information through user application 164 or may share information that is processed by one or more applications such as user application 164.

In some embodied systems, application server 160 hosts a user application 164 that includes an animation module, a background module, and other modules for providing avatars in a virtual environment that may be presented in one or more alternate forms on displays 124 simultaneously or alternately with one or more multimedia programs. In this capacity, server side 102 is enabled for providing a social interactive service (i.e., participating in a virtual environment) that is available to a plurality of users that may each be communicatively coupled to access network 130. In some embodiments, the virtual environment is transposed atop a multimedia program on a common display. Alternatively, the instances of the virtual environment may appear in border areas that surround viewing windows used in the presentation of a multimedia program on displays 124. Still further, the virtual environments may be presented within picture-in-picture windows or separate displays (not depicted) altogether. At a viewer's options, the multimedia program may be toggled alternately with the virtual environment using inputs received by remote 126. In some embodiments, user application 164 receives viewer requests to be presented or omitted from instances of a virtual environment. For example, a viewer may choose not to participate in an instance of a virtual environment presented on the display of a stranger.

A virtual environment presented in accordance with disclosed embodiments may include a plurality of avatars that correspond to a plurality of viewers that cameras 157 capture. The virtual environment, in some embodiments, contains a plurality of avatars that are simultaneously or alternately displayed during the presentation of a multimedia program on displays 124. An animation module (e.g., a software routine stored on a computer readable medium) may be hosted locally by STBs 121 or network based and hosted by application server 160. In other embodiments, computing and processing duties of animation modules and other similar systems are split between local devices and network-based devices. Viewer movements captured by cameras 157 are used to generate animation data that is processed and translated by one or more animation modules in corresponding avatar emotions and actions. Each viewer has a corresponding avatar that may be shown in each instance of a virtual environment. In some embodiments, a viewer may block presentation of the viewer's avatar in one or more instances of a virtual environment. In addition, a viewer may choose to view an instance of a virtual environment without otherwise participating in it by allowing local animation data to be collected and processed. In some embodiments, viewers may limit presentation of their corresponding avatars to certain other viewers. In such cases, user application 164 or related applications may be responsible for maintaining a list of permissions and user preferences regarding when to include a viewer's avatar in certain instances and versions of the virtual environment.

Upon receiving animation data captured by cameras 157 a network-based system operating with user application 164 may translate the animation data into a plurality of synthetic avatar actions taken by corresponding avatars. The synthetic avatars are included, at a viewer's options in some cases, in identical or similar versions of the virtual environment presented on displays 124. Typically, the synthetic avatar actions are intended to mimic actions by corresponding viewers. Therefore, in an exemplary embodiment, the virtual environment includes a plurality of avatars that are animated with the synthetic avatar actions and the synthetic avatar actions result from animation data captured by cameras 157. The animation data may include facial animation data and other movement data. Further, user application 164 may process animation data from cameras 157 to detect when a viewer enters or leaves a viewing area. In response to such detection of movement into or out of a viewing area, user application 164 may correspondingly simulate the avatar entering or leaving the virtual environment. In some cases, speech captured from viewers is presented to other viewers or presented in the virtual environment. For example, user application 164 may translate captured speech into text, and after speech recognition processing the text may be presented in graphical form in the virtual environment. This provides a social interactive television environment in which viewers may comment on the multimedia program that is then displayed.

Although some embodiments rely on user application 164 to process animation data, other embodiments may spread processing tasks among other devices such as STBs 121. In some cases, STBs 121 process animation data and present the processed data to user application 164 or directly to other STBs. In turn, some combination of STBs 121 and user application 164 processes the animation data and creates for presentation on displays 124 the virtual environment including a plurality of synthetic avatars that generally mimic the movements and emotions of corresponding, participating viewers.

Additional elements shown in FIG. 1 include database switch 116, which is connected to applications switch 117 and provides access to database resources 109. Database resources 109 include a database server 170 that manages a system storage resource 172, also referred to herein as user store 172. User store 172, as shown, includes one or more user profiles 174 where each user profile includes account information and may include preferences information that may be retrieved by applications executing on application server 160 including subscriber application 165.

MCDN 100, as shown, includes an OSS/BSS resource 108 including an OSS/BSS switch 115. OSS/BSS switch 115 facilitates communication between OSS/BSS resources 108 via public network 112. The OSS/BSS switch 115 is coupled to an OSS/BSS server 181 that hosts operations support services including remote management via a management server 182. OSS/BSS resources 108 may include a monitor server (not depicted) that monitors network devices within or coupled to MCDN 100 via, for example, a simple network management protocol (SNMP).

As shown in FIG. 1, cameras 157 are physically coupled to, integrated into, or placed near displays 124. In accordance with disclosed embodiments, camera 157-1 captures an image of a viewer (i.e., a first viewer) of STB 121-1 and camera 157-2 captures an image of a viewer (i.e., a second viewer) of STB 121-2. In addition, cameras 157 may employ a motion detector (not depicted) to determine when a viewer is present. When no viewer is detected, cameras 157 may capture images of the background environments in which the viewers sit. After motion is detected by a viewer entering the background environment, cameras 157 and supporting processing modules may subtract the background environments. After subtracting the background environments, avatars of each viewer are presented on displays 124. In some cases, the avatars are presented with a common background in a virtual environment. For example, avatars may be shown together in a virtual living room or movie theater. Although cameras 157 are illustrated in FIG. 1 as possibly physically coupled to displays 124, the cameras may be separate from displays 124. For example, the cameras may be integrated into STBs 121 or remote control devices 126. In some disclosed embodiments, the cameras monitor viewers to estimate facial expressions and emotions that can be translated into corresponding facial expressions and emotions in a displayed avatar. In addition, as a viewer walks around, walks into, or walks out of a viewing area, such motion can be tracked by cameras 157 and translated into analogous motions from avatars presented on displays 124.

Figure 2:
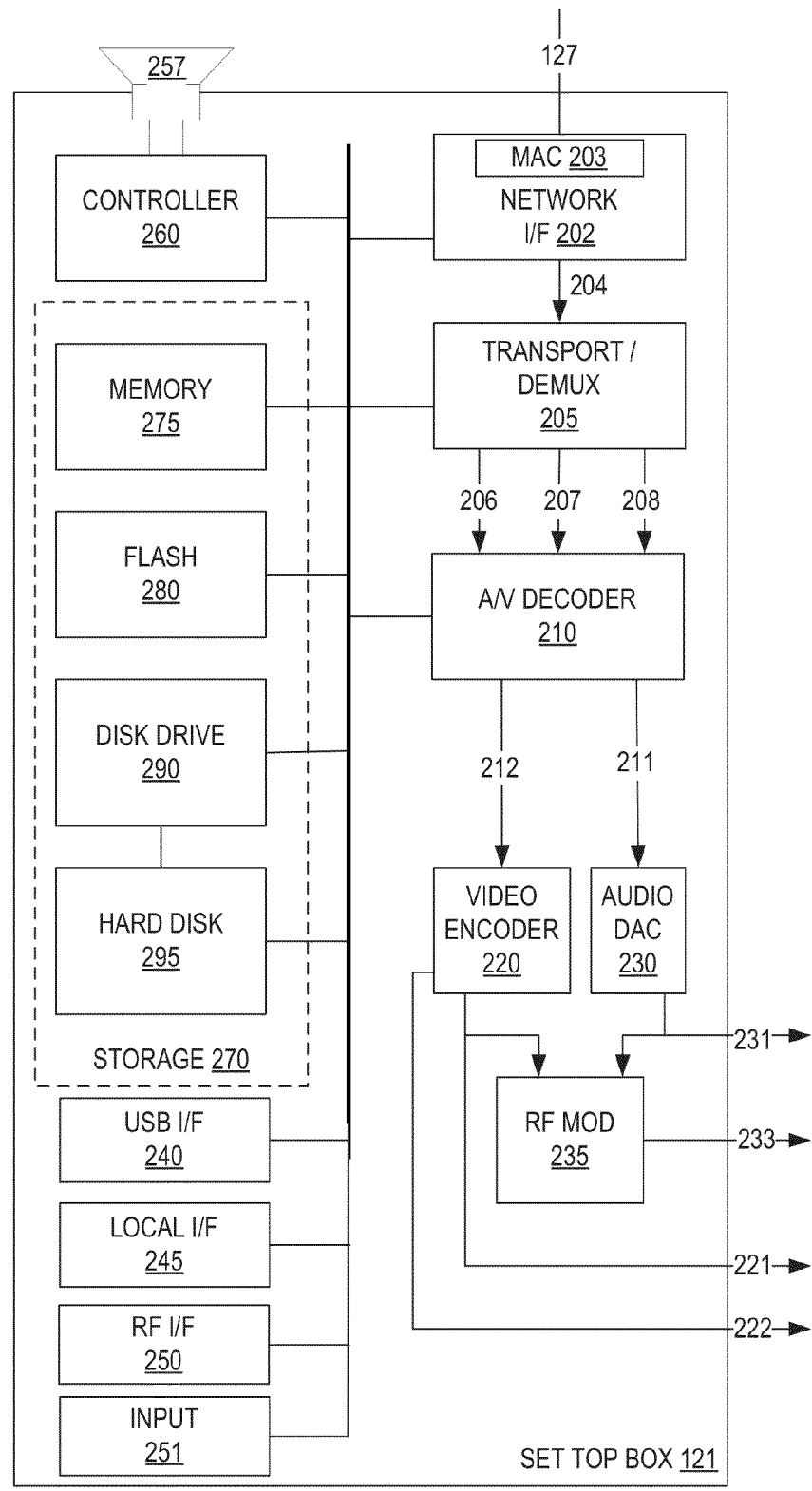
FIG. 2 depicts, in block diagram form, selected elements of an embodied set-top box.

FIG. 2 depicts selected components of STB 121, which may be similar to or identical to STB 121 in FIG. 1. As shown, STB 121 (FIG. 2) is enabled to provide multimedia output that includes a virtual environment that may be presented simultaneously with a multimedia program. As shown, STB 121 is suitable for use in an IPTV client and includes functionality in some combination of hardware, software, and firmware to receive streaming multimedia data from an IP-based network and process the data to produce video and audio signals suitable for delivery to an NTSC, PAL, or other type of display 124. In addition, some embodiments of STB 121 may include resources to store multimedia content locally and resources to play back locally stored multimedia content.

As shown in FIG. 2, STB 121 includes a general-purpose processing core represented as controller 260. Controller 260 communicates with special purpose multimedia modules including, as examples, transport/demultiplexer module 205, an A/V decoder 210, a video encoder 220, an audio digital-to-analog converter (DAC) 230, and an RF modulator 235. Although FIG. 2 depicts each of these modules discretely, STB 121 may be implemented with a system on chip (SoC) device that integrates controller 260 and each of these multimedia modules. In still other embodiments, STB 121 may include an embedded processor serving as controller 260 and at least some of the multimedia modules may be implemented with a general-purpose digital signal processor (DSP) and supporting software.

As shown in FIG. 2, input module 251 is for receiving animation input that is captured from a viewer or viewers that are likely in a viewing area near STB 121. For example, a video camera (not depicted) maybe be coupled to input module 251 for capturing live video data that may be processed and relayed by input module 251 to other components within STB 121 including controller 260 and storage 270. Input module 251, in some embodiments, may also receive, process, and relay audio signals that are indicative of a viewer's speech. In turn, the audio signals may be displayed as text within a virtual environment. For example, STB 121 and similar STBs in a networked environment may be enabled for performing speech recognition on the comments of their respective viewers, attributing the comments to the correct viewers, and displaying textual versions of the text as callouts (e.g., clouds filled with text) on displays that are used to simultaneously view a multimedia program and a virtual environment that includes avatars representing each of the viewers. In some embodiments, input 251 is enabled for receiving signals from remote devices such as cameras, microphones, presence detectors, motion detectors, and the like.

As shown, STB 121 includes a network interface 202 that enables STB 121 to communicate with an external network such as LAN 127. Network interface 202 may share many characteristics with conventional network interface cards (NICs) used in personal computer platforms. For embodiments in which LAN 127 is an Ethernet LAN, for example, network interface 202 implements level 1 (physical) and level 2 (data link) layers of a standard communication protocol stack by enabling access to the twisted pair or other form of physical network medium and by supporting low level addressing using media access control (MAC) addressing. In these embodiments, every network interface 202 includes, for example, a globally unique 48-bit MAC address 203 stored in a read-only memory (ROM) or other persistent storage element of network interface 202. Similarly, at the other end of the LAN connection 127, RG 122 (FIG. 1) has a network interface (not depicted) with its own globally unique MAC address. Communication between STBs may be used to accomplish the display of avatars corresponding to remotely located viewers in accordance with disclosed embodiments.

Network interface 202 may further include or support software or firmware providing one or more complete network communication protocol stacks. Where network interface 202 is tasked with receiving streaming multimedia communications, for example, network interface 202 may include a streaming video protocol stack such as an RTP/UDP stack. In these embodiments, network interface 202 is operable to receive a series of streaming multimedia packets and process them to generate a digital multimedia stream 204 that is provided to transport/demux 205.

As shown in FIG. 2, STB 121 carries and processes digital multimedia stream 204, which in accordance with disclosed embodiments contains a multimedia program, a virtual environment with avatars, and any associated audio data. The digital multimedia stream 204 is a sequence of digital information that includes interlaced audio data streams and video data streams. The video and audio data contained in digital multimedia stream 204 may be referred to as "in-band" data in reference to a particular frequency bandwidth that such data might have been transmitted in an RF transmission environment. Digital multimedia stream 204 may also include "out-of-band" data that might encompass any type of data that is not audio or video data, but may refer in particular to data that is useful to the provider of an IPTV service. This out-of-band data might include, for example, billing data, decryption data, and data enabling the IPTV service provider to manage IPTV client 120 remotely. In some embodiments, some combination of the virtual environment or associated animation data may be transmitted as out-of-band data and otherwise excluded from the audio or video portions of digital multimedia stream 204.

Transport/demux 205 as shown is operable to segregate and possibly decrypt the audio, video, and out-of-band data in digital multimedia stream 204. Transport/demux 205 outputs a digital audio stream 206, a digital video stream 207, and an out-of-band digital stream 208 to A/V decoder 210. Transport/demux 205 may also, in some embodiments, support or communicate with various peripheral interfaces of STB 121 including a radio frequency (RF) interface 250 suitable for use with an RF remote control unit (not shown) and a front panel interface (not shown). RF interface 250 may also be compatible to receive infrared signals, light signals, laser signals, or other signals from remote control devices that use signal types that differ from RF signals. RF interface 250 represents a hardware interface that may be enabled for receiving signals indicative of user inputs. For example, a user may provide user inputs to a remote control device for selecting or highlighting EPG elements on a display or setting preferences regarding the presentation of a user's avatar in a virtual environment.

A/V decoder 210 processes digital audio, video, and out-of-band streams 206, 207, and 208 respectively to produce a native format digital audio stream 211 and a native format digital video stream 212. A/V decoder 210 processing may include decompression of digital audio stream 206 and/or digital video stream 207, which are generally delivered to STB 121 as compressed data streams. In some embodiments, digital audio stream 206 and digital video stream 207 are MPEG compliant streams and, in these embodiments, A/V decoder 210 is an MPEG decoder.

The digital out-of-band stream 208 may include information about or associated with content provided through the audio and video streams. This information may include, for example, the title of a show, start and end times for the show, type or genre of the show, broadcast channel number associated with the show, and so forth. A/V decoder 210 may decode such out-of-band information. MPEG embodiments of A/V decoder 210 support a graphics plane as well as a video plane and at least some of the out-of-band information may be incorporated by A/V decoder 210 into its graphics plane and presented to display 124, perhaps in response to a signal from a remote control device. In addition to potentially including data for presenting a virtual environment, the digital out-of-band stream 208 may be a part of an EPG, an interactive program guide, or an electronic service guide (ESG). These devices allow a viewer to navigate, select, and search for content by time, channel, genre, title, and the like. A typical EPG may have a GUI that enables the display of program titles and other descriptive information such as program identifiers, a summary of subject matter for programs, names of actors, names of directors, year of production, and the like.

As shown in FIG. 2, the native format digital audio stream 211 is routed to audio DAC 230 to produce an audio output signal 231. The native format digital video stream 212 is routed to an NTSC/PAL or other suitable video encoder 220, which generates digital video output signals suitable for presentation to an NTSC or PAL compliant display device. In the depicted embodiment, video encoder 220 generates a composite video output signal 221 and an S video output signal 222. An RF modulator 235 receives the audio and composite video output signals 231 and 221 respectively and generates an RF output signal 233 suitable for providing to an analog input of a display (e.g., display 124 from FIG. 1). STB 121, as shown, includes universal serial bus (USB) interface 240 and a local interconnection interface 245. Local interconnection interface 245 may, in some embodiments, support Home Phone Networking Alliance (HPNA) or another form of local interconnection 123 as shown in FIG. 1.

In accordance with disclosed embodiments, STB 121 receives animation input data over input 251 from a camera (e.g., camera 257-1 in FIG. 1). In addition, STB 121 is enabled for displaying a virtual environment including, at a viewer's option, an avatar corresponding to the viewer as captured by the camera. The avatar is displayed in a virtual environment that includes further avatars corresponding to further viewers (i.e., STB users). Typically, avatars are continually updated in response to further animation input data that is received continually or often enough to simulate viewer actions, emotion, facial expressions, and the like in the virtual environment. Multiple instances of the virtual environment, and example embodiments, are presented on displays (e.g., display 124-2 as fed by STB 121-2 and display 124-1 as fed by STB 121-1 in FIG. 1). A user of STB 121 may employ a remote control device (e.g., remote control device 126-1) which communicates with RF interface 250 to accept user input regarding whether the user wishes to have the viewer's corresponding avatar displayed in local or remote instances of the virtual environment. In some embodied systems, a viewer may enter a new virtual environment each time a new channel or multimedia program is chosen. In this way, an avatar corresponding to a viewer is presenting in one of many virtual environments, as the viewer tunes to one of many multimedia programs or channels. In addition, many virtual environments may be available for a single channel or multimedia program. A user may choose to enter virtual environments based on predetermined settings such as common interests, age, or geographic region with other viewers.

The illustrated embodiment of STB 121 includes storage resources 270 that are accessible to controller 260 and possibly one or more multimedia modules. Storage 270 may include dynamic random access memory (DRAM) or another type of volatile storage identified as memory 275 as well as various forms of persistent or nonvolatile storage including flash memory 280 and/or other suitable types of persistent memory devices including ROMs, erasable programmable read-only memory (EPROMs), and electrical erasable programmable read-only memory (EEPROMs). In addition, the depicted embodiment of STB 121 includes a mass storage device in the form of one or more magnetic hard disks 295 supported by an integrated device electronics (IDE) compliant or other type of disk drive 290. Embodiments of STB 121 employing mass storage devices may be operable to store content locally and play back stored content when desired. In addition, one or more components of storage 270 may be employed to store animation input data and baseline data used to build and maintain avatars for presenting within a virtual environment.

Social interactive systems provided with digital television may employ character-based avatars such a silhouettes or cartoon characters. Such avatars may have only limited ability for expression. In addition, such avatars may not provide accurate representations regarding physical qualities or emotions for their respective viewers. To make up for these shortcomings, some systems may require that names are given to avatars so that viewers of a virtual environment can match avatars to their corresponding viewers. In contrast to systems that inaccurately represent viewer participants in a virtual environment, disclosed embodiments are enabled to provide realistic, synthetic versions of participants in interactive, social environments by employing synthesized avatars for each participant built in part using input from a camera communicatively coupled to or integrated into a set-top-box, television, or monitor. In some embodiments, if no motion is detected for an extended period, an image may be captured and used as a reference image. In other cases when motion is detected (e.g., when participants in interactive television sit down to watch television) the viewers are extracted from a captured image by comparing what parts of the image have changed from the reference image. This process can be repeated in real time so that video avatars of the viewers can be created. An added benefit of this technique is that all viewers present in the camera's viewing area may be extracted and represented digitally and automatically. In addition, the viewer participants located in different sites may be assembled together and represented on the televisions of each participant as if they are all in the same room and sitting together.

Although many interactive social settings in a network rely on pre-created avatars, disclosed embodiments relay on representations of viewers that are created in part using inputs from a camera or from video images. Avatars may be scaled, cropped, or changed as desired by a viewer with software-based editing systems. Disclosed systems may adjust (e.g., normalize) contrast and brightness for avatars created in different locations to achieve a realistic presentation of multiple avatars together. In interactive settings in which a group of friends is assembled, names may not be necessary so a recognition module may not be required. If a participant walks into or out of a room (or the camera range), that participant's avatar may be shown as walking onto or off the television screen of each participant. Accordingly, disclosed embodiments provide an immersive and intimate way for friends to watch multimedia programming (e.g., digital television) and interact with each other. In addition to seeing facial expressions, posture, and other body language, actions such as pointing to onscreen content are possible. In addition, text-based callouts may be added next to avatars to provide viewers a silent way of communicating while participating in the virtual environment.

Figure 3:
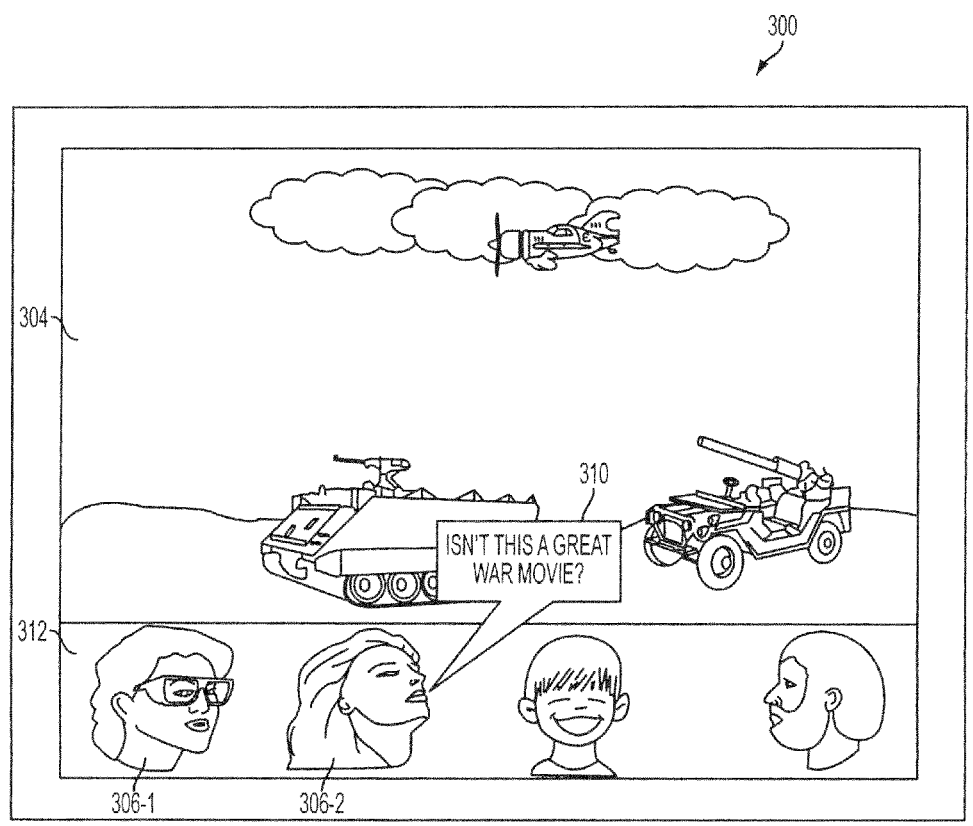
FIG. 3 depicts a screen shot from a social interactive television environment that, in accordance with disclosed embodiments, simultaneously contains a virtual environment with avatars and the presentation of a multimedia program.

FIG. 3 depicts a screen shot 300 from a social interactive television environment that, in accordance with disclosed embodiments, simultaneously contains a virtual environment 312 and a multimedia program displayed in a multimedia program viewing window 304. As shown, virtual environment 312 includes avatars 306 that correspond to a plurality of viewer participants. In some embodiments, avatars 306 correspond to viewers located at physically separate sites serviced by separate STBs and RGs that are communicatively coupled to a common provider network. As shown, avatar 306-2 has a corresponding callout 310. In some embodiments, callout 310 is automatically generated with the aid of a speech recognition module running on an STB for the viewer corresponding to avatar 306-2. In response to detecting voice input from the viewer, the viewer's STB recognizes the speech and, at the viewer's option, attributes the speech to the viewer. In addition, the attributed speech may be provided directly or over the provider network to other STBs for inclusion in other instances of the virtual environment 312 that are presented in locations that are remote from the viewer corresponding to avatar 306-2.

Figure 4:
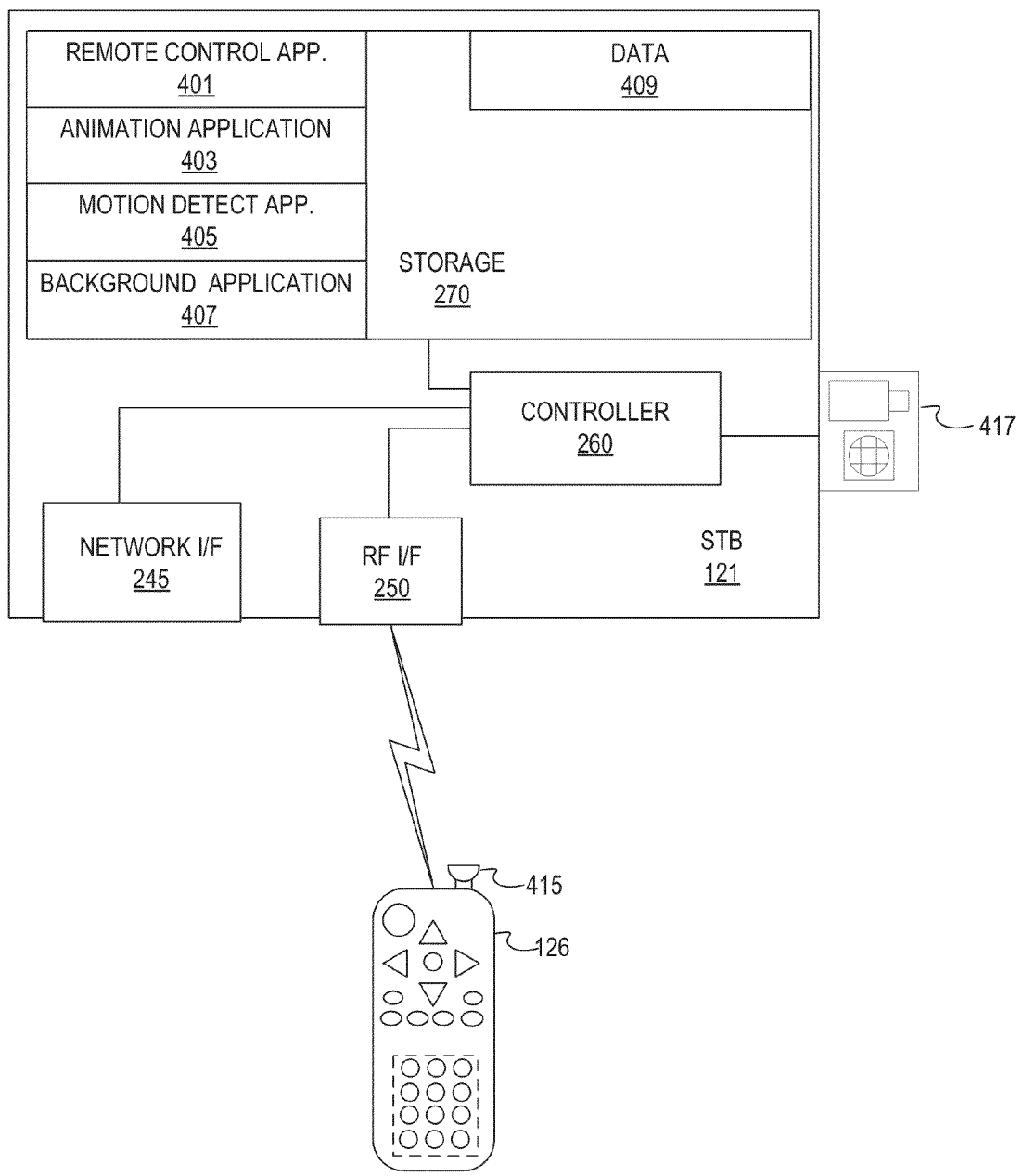
FIG. 4 depicts, in block diagram form, selected software-based applications of an embodied set-top box for capturing and processing animation data and presenting a virtual environment in accordance with disclosed embodiments.

FIG. 4 illustrates STB 121, which has selected software elements (e.g., software applications) operable for presenting a virtual environment containing a plurality of synthetic avatars in accordance with disclosed embodiments. In the depicted implementation, storage 270 includes programs or execution modules identified as remote control application 401, animation application 403, motion detection application 405, and background application 407. In addition, the depicted implementation of storage 270 includes data 409.

Remote control application 401 includes computer executable code that supports STB 121's remote control functionality. For example, when a viewer depresses a volume button on remote control device 126 (FIG. 1), remote control application 401 is invoked by controller 260 in response to a signal from RF I/F 250 indicating that RF I/F 250 has received a remote control command signal. Although the embodiments described herein employ a wireless remote control device 126 to convey viewer commands to STB 121, the viewer commands may be conveyed to STB 121 in other ways. For example, STB 121 may include a front panel having function buttons that are associated with various commands, some of which may coincide with commands associated with function buttons on remote control device 126. Similarly, although remote control device 126 is described herein as being an RF or IR remote control device, other embodiments may use other media and/or protocols to convey commands to STB 121. For example, remote control commands may be conveyed to STB 121 via USB (Universal Serial Bus), WiFi (IEEE 802.11-family protocols), and/or Bluetooth techniques, all of which are well known in the field of network communications.

RF I/F 250 may be operable to parse or otherwise extract the remote control command that is included in the signal. The remote control command may then be made available to controller 260 and/or remote control application 401. In this manner, remote control application 401 may receive an indication of the remote control command from the RF I/F 250 directly or from controller 260. In the latter case, for example, controller 260 might call remote control application 401 as a function call and include an indication of remote control 126 as a parameter in the function call.

Within a virtual environment that is presented in accordance with disclosed embodiments by STB 121 in FIG. 4, the avatars are created and maintained in part by animation application 403 using animation input data received through camera 417. As shown, controller 260 processes the animation input data by running animation application 403 and related applications. Motion detection application 405 may be operational to detect when a viewer enters or leaves a viewing area. Network interface 245 may receive directly from other STBs or over a provider network (e.g., access network 130 in FIG. 1) animation data and other data related to viewers in viewing areas remote to STB 121 that are to be included in a virtual environment presented by STB 121. Likewise, STB 121 may provide animation data to other STBs over network interface 245 for a viewer or viewer that is local to STB 121. As shown, remote control device 126 includes input module 415 that may capture some combination of audio, video, and presence data for transmission to STB 121. In this way, animation data for use in creating and maintaining avatars associated with viewers local to STB 121 may be captured by remote control device 126.

Figure 5:
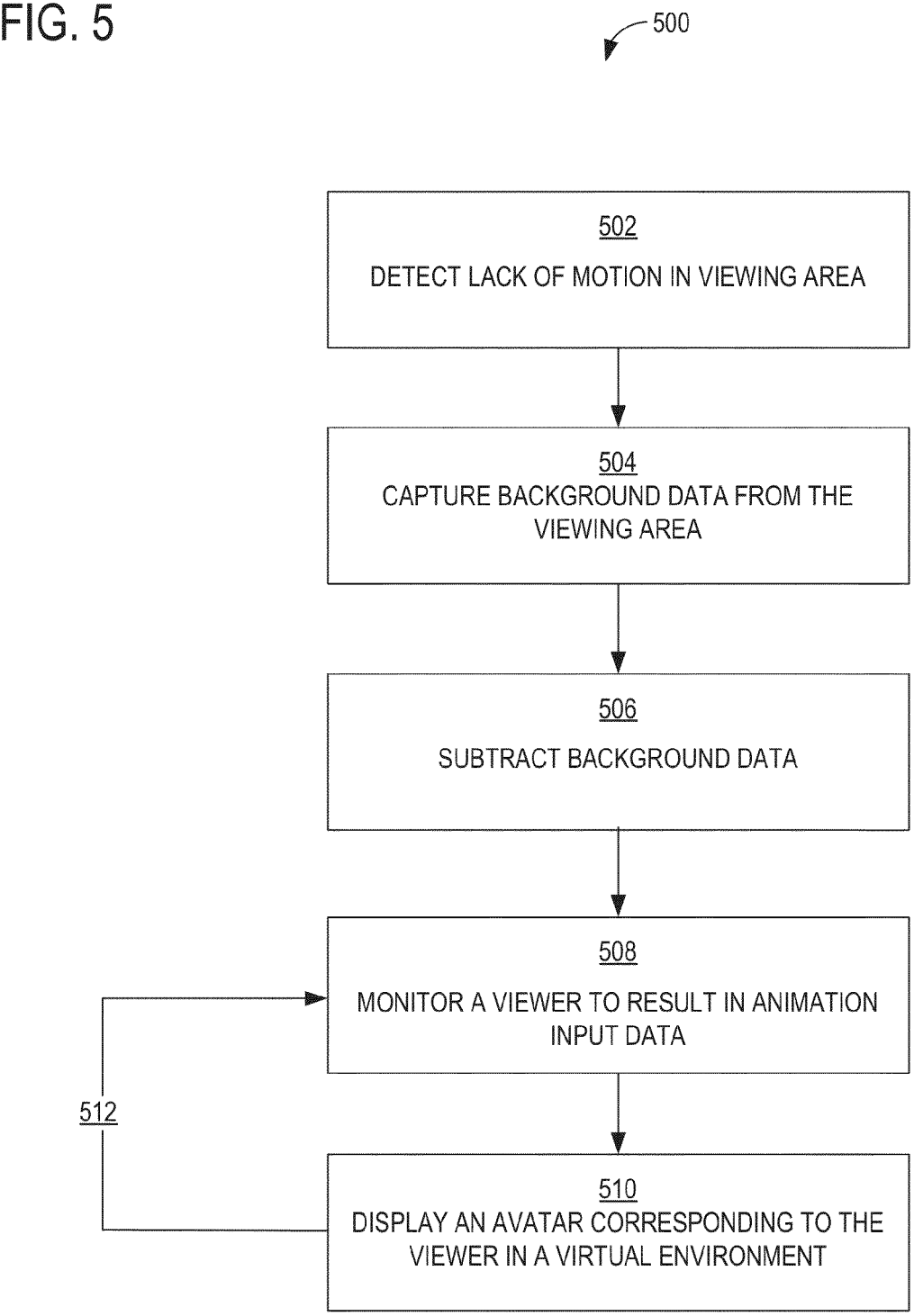
FIG. 5 is a flow diagram with selected operations for capturing animation data and presenting a virtual environment in accordance with disclosed embodiments.

Referring now to FIG. 5, methodology 500 includes operations 502-510 for presenting a virtual environment including a plurality of avatars that mimic viewer actions and emotions in accordance with disclosed embodiments. Methodology 500 may be carried out by a computer program product that has machine executable instructions. The virtual environment presented in accordance with some disclosed embodiments is displayed simultaneously (e.g., in a separate viewing window, transposed over, or in a PIP window) with instances of a multimedia program that are also presented to viewers. In many applications, viewers are located in different sites (e.g., homes or rooms) and the virtual environment is used as a means for the viewers to socialize in an interactive way. As shown, operation 508 relates to monitoring a viewer to result in animation input data. Operation 510 relates to displaying an avatar corresponding to the viewer in a virtual environment. As shown, methodology 500 includes loop 512, which relates to returning to operation 508 from operation 510 for further monitoring of the viewer to result in updated animation input data. Therefore, in accordance with disclosed embodiments, by executing operations 508 and 510 with loop 512, one or more viewers are monitored continually to result in continually updated animation input data.

Prior to or during a viewing session, an embodied system executing methodology 500 optionally may perform processing to subtract background images from images captured from a viewing area. In this way, images of a viewer or viewers may be added to a virtual environment without adding extra background aspects of a viewing area such as furniture and similar items. Accordingly, methodology 500 illustrates optional operation 502 that relates to detecting a lack of motion in a viewing area that may typically contain one or more viewers during a viewing session. Operation 502 may be accomplished in software using data obtained by a camera, otherwise operation 502 may be accomplished using one or more motion sensors directed at a viewing area. As shown, optional operation 504 relates to capturing background data from the viewing area. In addition, optional operation 506 relates to subtracting the background data. In some embodiments, a viewer may be presented with a virtual environment on a display. The virtual environment may depict the viewer's actual environment with other synthetic avatars that depict other viewers from other locations added to the viewer's virtual environment. Embodied systems may present other viewers within virtual environments that are distinct from the virtual environment in which a primary viewer is presented. In other words, each viewer may be presented in a separate virtual environment or virtual room. In some cases, a viewer selects through user input whether an avatar corresponding to the viewer is allowed in the virtual environments of other viewers. Accordingly, operation 510 in methodology 500 may relate to displaying avatars for multiple viewers depending on whether user input permits it.

While the disclosed systems may be described in connection with one or more embodiments, it is not intended to limit the subject matter of the claims to the particular forms set forth. On the contrary, disclosed systems are intended to include alternatives, modifications and equivalents as may be included within the spirit and scope of the subject matter as defined by the appended claims. For example, although disclosed embodiments are often described in terms of STBs, it should be noted that disclosed embodiments may incorporate such functionality into data processing systems, displays, televisions, or monitors that do not have physical characteristics, for example, of traditional converter boxes that may have been operated from atop a television, as the name "set-top box" may otherwise suggest.

What is claimed is:

1. A method, comprising:
    processing background data indicative of a viewing area and animation data indicative of a viewer in the viewing area watching a multimedia program to generate a viewer avatar indicative of the viewer watching the multimedia program with a background area removed;
    displaying the multimedia program, the viewer avatar, and further avatars corresponding to further viewers; and
    responsive to detecting the viewer exiting the viewing area, terminating the displaying of the viewer avatar.

2. The method of claim 1, wherein the viewer avatar reflects facial expression data, indicative of changing facial expressions of the viewer.

3. The method of claim 2, wherein the facial expression data indicate laughter by the viewer.

4. The method of claim 1, wherein displaying the viewer avatar and the further avatars includes superimposing at least one of the viewer avatar and the further avatars over the multimedia program.

5. The method of claim 1, further comprising:
    capturing images of the viewing area responsive to determining a level of motion in the viewing area below a predetermined threshold.

6. The method of claim 1, further comprising:
    responsive to detecting a second viewer in the viewing area, displaying a second viewer avatar adjacent the viewer avatar.

7. A system for presenting multimedia programs, the system comprising:
    a processor having access to a computer readable medium, wherein the computer readable medium includes program instructions executable by the processor, to perform operations including:
        processing background data indicative of a viewing area and animation data indicative of a viewer in the viewing area watching the multimedia program to generate a viewer avatar indicative of the viewer watching the multimedia program with a background area removed;
        displaying the multimedia program, the viewer avatar, and further avatars corresponding to further viewers; and
        responsive to detecting the viewer exiting the viewing area, terminating the displaying of the viewer avatar.

8. The system of claim 7, wherein the operations include:
    responding to detecting a level of motion in the viewing area around the viewer below a first predetermined threshold level of motion by capturing background data from the viewing area.

9. The system of claim 7, wherein the operations include:
    responsive to determining that the viewer is entering the viewing area, causing the displaying of the avatar entering the virtual environment.

10. The system of claim 7, wherein the viewer data includes time varying facial expression data indicative of changing facial expressions of the viewer.

11. The system of claim 10, wherein the facial expression data includes data indicative of laughter by the viewer.

12. The system of claim 7, wherein the operations include:
    representing avatar motion based on the animation data, wherein the avatar motion corresponds to a viewer motion detected in the animation data.

13. A non-transitory computer readable storage media including program instructions executable by a processor, to perform operations, comprising:
    processing background data indicative of a viewing area and animation data indicative of a viewer in the viewing area watching the multimedia program to generate a viewer avatar indicative of the viewer watching the multimedia program with a background area removed;
    displaying the multimedia program, the viewer avatar, and further avatars corresponding to further viewers; and
    responding to detecting the viewer exiting the viewing area by terminating the displaying of the viewer avatar.

14. The storage media of claim 13, wherein the operations include:
    sending a rendering of the viewer avatar and the further avatars to the user for display.

15. The storage media of claim 14, wherein sending the rendering includes sending the rendering substantially simultaneously to the viewer avatar and the further viewers.

16. The storage media of claim 7, wherein the animation data includes facial animation data.

17. The storage media of claim 16, wherein the facial animation data indicates variations in facial expressions of the viewer.

18. The storage media of claim 16, wherein the operations include:
    extracting the facial animation data from the animation data by subtracting background data, wherein the facial animation data substantially represents the viewer and does not represent the background area comprising a monitoring area around the viewer.

* * * * *